Patented Aug. 8, 1939

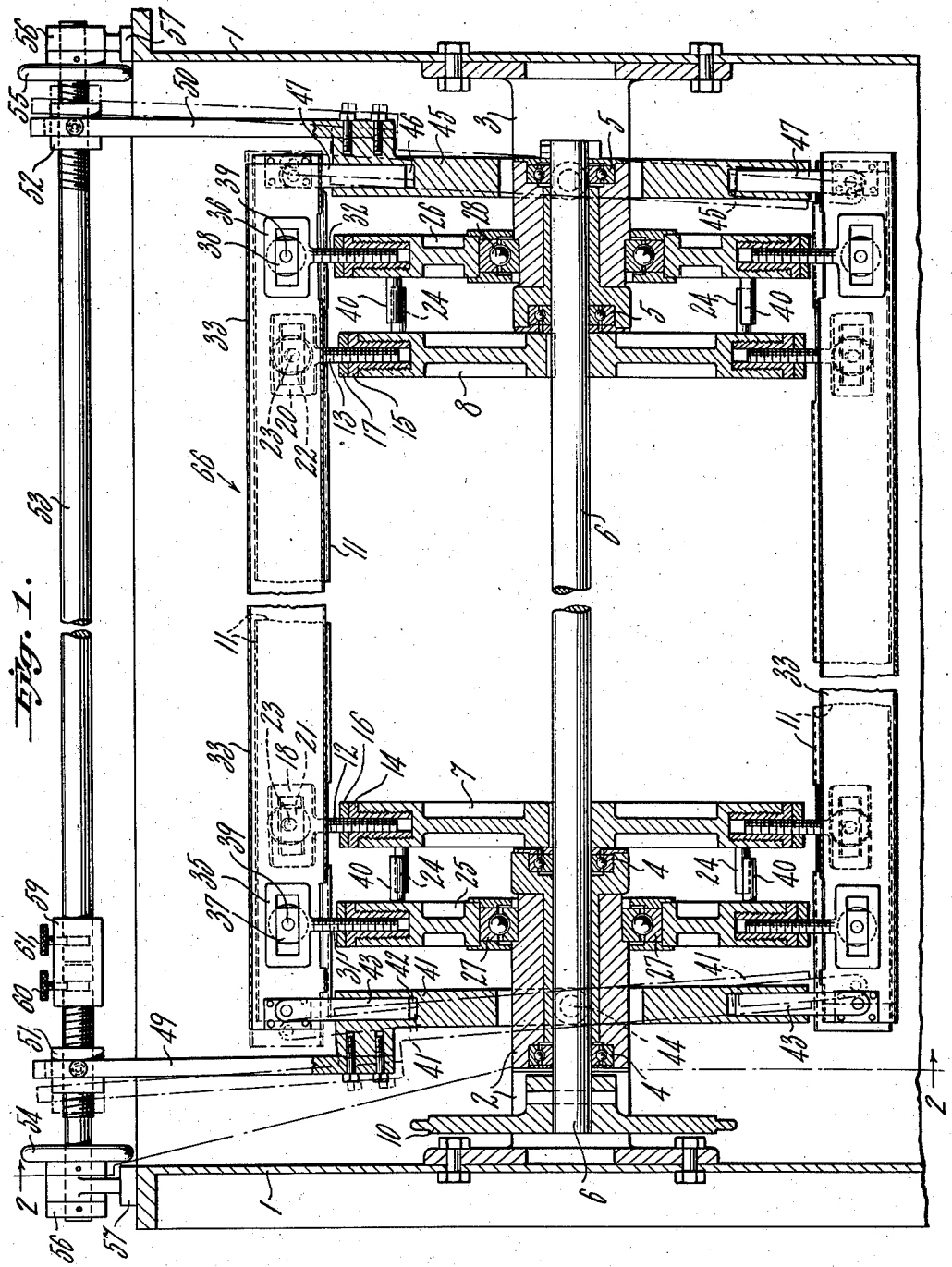

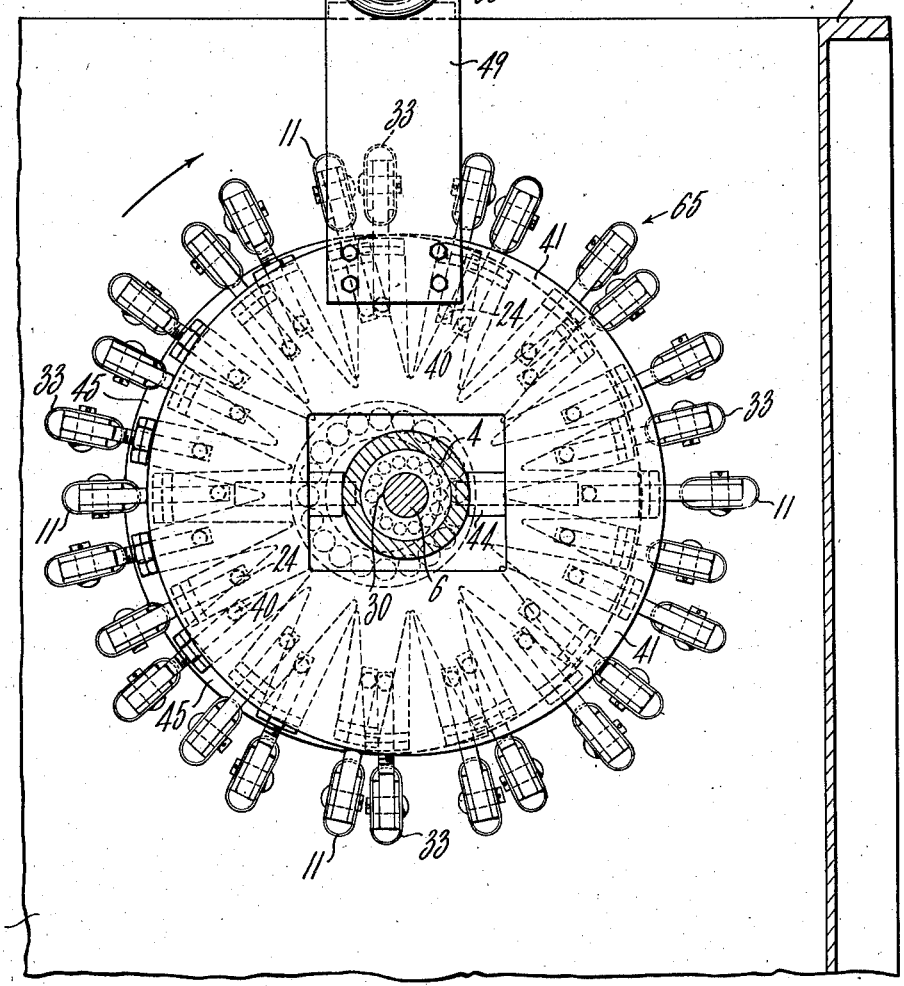

2,168,555

UNITED STATES PATENT OFFICE 2,168,555

CONTINUOUS CONVEYING APPARATUS

Harold T. Battin, Ridgewood, N. J., assignor, by mesne assignments, to United States Rubber Company, New York, N. Y., a corporation of New Jersey Application November 20, 1937, Serial No. 175,662

8 Claims. (Cl. 242—53)

This invention relates to continuous conveying apparatus, and more particularly to a rotary drum which is adapted to receive continuous lengths of material and carry them forward helically as the drum rotates.

The invention is especially useful in vulcanizing continuous strips or tubes of rubber within a chamber, the rubber being fed onto the drum and propelled in helices along the drum during the curing process.

It has previously been proposed to provide a cylindrical apparatus for progressively advancing strips of material along a cylinder. In these former constructions, cams, longitudinal conveying belts, or carrying elements with angularly disposed axes have been employed to effect the conveyance of the material forwardly in a direction corresponding to the longitudinal axis of the cylinder. The applicability of such constructions is limited to handling materials having constant stretching or shrinking properties, and to conveying successive turns longitudinally forward at constant distances apart.

The present invention provides a drum, which in its normal position of adjustment, has a generally cylindrical configuration. The drum comprises two intercalated systems of slats which revolve about fixed parallel axes which are positioned slightly eccentric with respect to each other. The systems of slats reciprocate in longitudinal directions parallel to the axes, but with the interleaved slats of one system generally moving in a longitudinal direction opposite to those of the other system. A strip or thread of material is fed onto one end of the drum, and the drum is rotated, while at the same time the slats alternately reciprocate to translate the material forward in helices to the other end of the drum, whence the material may be removed. During this propulsion helically along the drum as it rotates, the material may be subjected to a treating or vulcanizing process.

The distance through which each system of slats reciprocates longitudinally may be varied at will. Consequently the apparatus is adjustable for different widths and/or spacings of material, resulting in efficient utilization of the entire surface of the drum.

The shape of the apparatus is also adjustable, so that it may be changed from a generally effective cylindrical configuration to that of a truncated cone. Accordingly, when the diameter of the apparatus at the forward end is adjusted to less than the diameter at the rearward end, the drum will automatically compensate for an increase in the length of the material, due to stretching, which may be the result of the treating process.

Similarly, in the case of material to which a stretch is not imparted by the treating process, this adjustment of the drum will produce a stretch or an increase in length of the material if such a result is desired, for the diameter of each helix or turn of the material will become successively greater than that preceding it. Conversely, when the diameter of the forward end of the drum is adjusted to a diameter greater than that of the rearward end, the drum will accommodate, without folding or buckling, a material which shrinks during the treating process.

A certain present preferred embodiment of my invention is illustrated in the drawings, in which:

Fig. 1 is a longitudinal cross sectional view of the apparatus, with the central portion omitted, and mounted in a vulcanizing tank;

Fig. 2 is a cross sectional view taken along the line 2—2 of Fig. 1;

Fig. 3 is an alternative form of a detail of the guiding mechanism;

Fig. 4 is an alternative form of a bearing construction.

Referring now to Figs. 1 and 2, a vulcanizing chamber or treating tank 1 supports brackets 2 and 3 which, respectively, carry bearings 4 and 5 which support a shaft 6. Spiders 7 and 8 are keyed to the shaft 6 which is driven by a sprocket 10, which, in turn, may be connected as by a chain to any suitable driving means such as an electric motor (not shown). Carrying elements or slats 11 are adjustably connected near each of their ends to the spiders 7 and 8 by means of eye-bolts 12 and 13, which screw into inserts 14 and 15 disposed within the ends of the spider arms and are retained in position by lock nuts 16 and 17. The outer ends 18 and 20 of the eye-bolts 12 and 13 slidably engage blocks 21 and 22 mounted on pivots 23 attached within the slats 11. These slats 11 revolving about the center or axis of the shaft 6 comprise one system of carrying elements. Each spider 7 and 8 carries a series of lugs 24 projecting parallel to the shaft 6.

Spider arms 25 and 26, having bearings 27 and 28, are mounted, respectively, on the brackets 2 and 3 in fixed eccentric relationship with respect to the shaft 6, and rotate about a fixed axis 30 to the left of the axis of the shaft 6, as shown in Fig. 2. These spider arms 25 and 26 adjustably carry eye-bolts 31 and 32 which extend into and hold carrying elements or slats 33 in slidable position, in the same manner as the previously described eye-bolts 12 and 13. The slats 33 alternate with the slats 11, as is clearly shown in Fig. 2. The eye-bolts 31 and 32 outwardly terminate, respectively, in eyes 35 and 36 which slidably engage blocks 37 and 38. The blocks 37 and 38 are mounted on pivots 39 attached within the slats 33. The slats 33 comprise the second system of carrying elements and revolve about the axis 30 which is parallel to, and positioned laterally of, the axis of the shaft 6. The spider arms 25 and 26 carry projecting lugs 40, against which the corresponding lugs 24 on spiders 7 and 8 will impinge in driving contact in certain positions.

The reciprocating longitudinal movement of the slats 33 is accomplished and controlled by a non-rotating guiding disc 41 having a track groove 42 in its periphery. The disc 41 is centered about the axis 30 and each of the slats 33 revolving about the axis 30 carries at its left end, as viewed in Fig. 1, a pivoted arm 43 which extends into the groove 42. The disc 41 is pivotally mounted in the tank 1 by a shaft 44 so that its angle of inclination with respect to the axis 30 may be varied.

Similarly, a non-rotating guiding disc 45 is pivotally mounted at the right side of the apparatus, encircling the bracket 3, and is centered with respect to the axis of the shaft 6. A peripheral track or groove 46 in the disc 45 receives, and controls the longitudinal movements of, arms 47 which are pivoted to the slats 11 and extend into the groove 46.

Connecting bars 49 and 50 are bolted at one of their ends respectively to the discs 41 and 45. The other end of each of these bars is pivotally mounted on swivel nuts 51 and 52, respectively, which are oppositely threaded. A shaft 53, carrying hand wheels 54 and 55 keyed to it, is mounted within collars 56 supported by brackets 57 which are supported by the upper portion of the vulcanizing chamber 1.

The ends of the shaft 53 are oppositely threaded to engage the threaded swivel nuts 51 and 52 respectively. The shaft 53 is divided and adjustably held rigid by a coupling 59. Thumb screws 60 and 61 adjustably engage the divided portions of the divided shaft 53 so that either or both portions may be rotated at will, by turning one of the hand wheels and releasing at least one of the thumb screws 60 or 61.

Fig. 3 illustrates a different method of guiding the arms 43 in the groove 42. The groove 42 is enlarged near the outer periphery of the guiding disc 41 to form shoulders 62. A ring 63 is fitted around the guiding disc 41 within the groove 42 so that it may revolve about the axis 30 as its inner face slides upon the shoulders 62. Holes 64 spaced circumferentially around the ring receive the arms 43 which may slide radially within the holes as radial adjustments of the slats 33 are made. Utilization of the ring 63 eliminates the wear of the arms 43 against the groove 42.

Fig. 4 illustrates an alternative bearing assembly in which packing or sealing rings 65 cooperate with the bearings 4 and 27, respectively, to form an oil seal. It is obvious that this oil sealing provision may be applied to all of the bearings shown in Fig. 1.

The two systems of slats 11 and 33 together comprise an effective drum 66.

In operation, the guiding discs 41 and 45 are inclined in opposite directions angularly to the parallel spiders 7, 8 and 25, 26, as shown by the dotted lines in Fig. 1. This angular setting may be accomplished at one time by tightening the set screws 60 and 61 to cause the shaft 53 to operate as a unit and then turning one of the hand wheels 54 or 55. Revolution of the hand wheel revolves the screw threads on the shaft 53 to move the swivel nuts 51 and 52 in opposite directions and over the same distance. Movement of the swivel nuts 51 and 52, each carrying, respectively, the connecting bars 49 and 50, varies the angular inclination of the guiding discs 41 and 45. By loosening one of the set screws 60 or 61, the position of either of the swivel nuts 51 or 52 may be determined separately, depending upon which of the hand wheels 54 or 55 is turned.

Revolution of the sprocket 10 in the direction of the arrow causes movements of the slats 11 around the axis of the shaft 6, as shown in Fig. 2. As the lugs 24 revolve in the system comprising the slats 11, they engage and drive the lugs 40 so that the slats 33 revolve about the axis 30. As is clearly shown in Fig. 2, the axis 30 is eccentric with respect to the axis of the shaft 6. Correspondingly, the slats 33 describe a circular path eccentric to the circular path of the slats 11. As the effective drum 66, comprising alternately the slats 33 and 11, revolves, the right or descending material-engaging surface comprises entirely the slats 11, since the axis of the shaft 6 is to the right of the axis 30. Similarly, the left or ascending material-engaging surface of the drum 66 comprises entirely the slats 33. At the top and bottom of the drum, material may be simultaneously engaged by both slats 33 and 11.

Reference to Figs. 1 and 2 together shows the longitudinal reciprocating movement of the intercalated slats 33 and 11. As a slat 33 travels in the direction of the arrow in Fig. 2 upwardly from the bottom to the top of the drum 66, its arm 43 travels in the inclined plane of the groove 42 so that upon arrival at the top of the drum 66 the slat has been moved longitudinally to the left, as shown by the dotted lines in Fig. 1. Considering the descent of the same slat 33 from top to bottom the longitudinal movement during that half revolution takes place to the right. Consequently, during their material-engaging half revolution, that is when ascending, the slats 33 are propelled longitudinally forward to the left, whereas they recede to the right during the half revolution in which they do not constitute the outer engaging surface of the effective drum.

Considering now a complete revolution of a slat 11 beginning at the bottom of the drum 66, it will be noted that the guiding disc 45 is set at an angle opposite in direction to that of the disc 41 so that its lower edge is forward, that is, to the left, as viewed in Fig. 1. As a slat 11 travels upwardly it is moved to the right by the engagement of the arm 47 within the sloping groove 46 which is inclined upwardly to the right. Its forward motion to the left occurs on its descent, that is, when it constitutes one of the material-engaging surfaces of the drum 66.

As a strip or tube of material is fed on to the upper right-hand surface of the drum, a short length of the moving strip will be engaged for a downward half-revolution by the slats 11 which move it to the left a distance determined by the inclination of the disc 45 from the vertical. The next upward half revolution of the length of the strip is accomplished by the slats 33, which carry the point helically forward to the left over a distance depending on the inclination of the guiding disc 41. The progress of the material is similarly accomplished along a helical path throughout its length by its alternate engagement with the slats comprising the different systems. When the material has reached the left end of the drum 66 it is removed.

When narrow strips or threads are to be conveyed by the drum the inclination of the guiding discs is adjusted to a minimum in order to conserve space. If rubber hose or other material having a greater width is supplied to the drum, the hand wheels 54 and 55 are adjusted to increase the angularity of the guide discs. Accordingly, precise economy of space along the drum may be attained.

During the vulcanizing, or other treating process, of material supplied in long lengths, considerable stretching or shrinking may occur. In order to compensate for stretching, the eye-bolts 31 and 12 are adjusted radially outwardly with respect to their retaining spider arms, and the eye-bolts 32 and 13 may be tightened inwardly. The effective drum 66 then assumes a generally conical shape, or, if the material has a tendency to shrink during the process of treatment, the eye-bolts 31 and 12 may be adjusted inwardly and the eye-bolts 13 and 32 may be adjusted outwardly, so that the base of the cone is reversed. This adjustment is accomplished by loosening the lock nuts, as 16 and 17, turning the eye-bolts in the screw threads the proper distance, and then tightening the lock nuts. By delicate radial adjustment of the slats, the material may be engaged very lightly, so that if soft material is used, it will not be marked by pressure contact with the slats. When the diameter of the drum is greater at one end than at the other, marking of the material is also reduced to a minimum because the successive series of slats will engage the material at different points, thus distributing the pressure contact along the material.

The conveying apparatus of the present invention has a variety of uses not restricted to the vulcanization of tubes, hose, thread, and strips of rubber within a vulcanizing chamber. When it is used for vulcanization, the vulcanizing chamber may be open or closed, depending upon the heat medium or other factors. Water, gas, steam, or air may be used to complete the vulcanization. The apparatus may also be used in conjunction with one or a succession of baths or other chemical treating processes where continuous lengths of thread, cord, yarn or other material are to be acted upon as they are continuously conveyed along the apparatus.

The variety of sizes, configurations, and compositions of material which the present drum will accommodate make its adjustable features of especial value. As explained heretofore, the apparatus may be adjusted to hold automatically the maximum number of helices of a particular material that can be collected on it, notwithstanding the width or size of the strip material. Also it may be adjusted to compensate automatically for increase or decrease of length of the material during the operation to which the material is subjected. It is obvious that the apparatus may rotate in either direction.

While I have shown and described a certain present preferred embodiment of the invention, it is to be understood that the invention may otherwise be embodied within the spirit of the invention and the scope of the appended claims.

Having thus described my invention, what I claim and desire to protect by Letters Patent is:

1. Conveying apparatus for a continuous length of material, comprising a plurality of interleaved systems of elongated carrying elements mounted for non-symmetrical movement about a common shaft, supporting means therefor comprising hubs for each system and means adjustably connecting the hubs and elements whereby the elements of the different systems engage the convolutions of material enclosing all the elements at different portions of each convolution, a common shaft for the hubs, inclined non-rotating guides for imparting relative longitudinal reciprocating movement between the elements of each system and the shaft, connecting means pivotally connected to each element of a system and travelling in one of said guides, pivotal mountings for the guides, and means for moving the guides angularly on their mountings for determining the amount of such relative longitudinal movement, whereby the material is progressively moved towards one end of the apparatus during the rotation of the elements.

2. Conveying apparatus for continuous lengths of material, comprising a plurality of interleaved systems of elongated carrying elements mounted for non-symmetrical movement about a common shaft, supporting means therefor comprising hubs for each system and means adjustably connecting the hubs and elements whereby the elements of the different systems engage the convolutions of material enclosing all the elements at different portions of each convolution, an arm pivoted to each element, a common shaft extending through the hubs, an inclined non-rotating guide engaging said arms of each system of elements for imparting relative longitudinal reciprocating movement between the elements and the shaft, and means for independently determining the amount of such relative movement produced by each guide, whereby the material is progressively moved towards one end of the apparatus during the rotation of the elements.

3. Conveying apparatus comprising a plurality of interleaved systems of elongated carrying elements mounted for non-symmetrical movement about a common shaft, supporting means therefor comprising hubs for each system and means adjustably connecting the hubs and elements whereby the elements of the different systems may engage convolutions of material enclosing all the elements at different portions of each convolution, a common shaft extending through the hubs, inclined non-rotating guides encircling said shaft at the opposite ends of said systems, means for slidably connecting one system of elements to each of the guides, a pivotal mounting for each guide for turning the associated guide angularly with respect to said shaft, and means for independently determining the angular movement of each guide for determining the amount of relative movement between the elements and the shaft, whereby the material is progressively moved towards one end of the apparatus during the rotation of the elements.

4. Conveying apparatus comprising a plurality of interleaved systems of elongated carrying elements mounted for non-symmetrical movement about a common shaft, supporting means therefor comprising hubs for each system and arms adjustably connecting the hubs and elements whereby the elements of the different systems engage the convolutions of material enclosing all the elements at different portions of each convolution, a common shaft extending through the hubs, inclined non-rotating guides encircling said shaft at the opposite ends of said systems, means for slidably connecting one system of elements to each of the guides, a pivotal mounting for each guide for turning the associated guide angularly with respect to said shaft and means for independently or jointly angularly inclining each guide for determining the amount of relative movement between the elements and the shaft, whereby the material is progressively moved towards one end of the apparatus during the rotation of the elements.

5. In a drum for supporting and conveying continuous material, a plurality of systems of interleaved slats, each slat having a pivotally connected arm, each system revolving about a fixed axis parallel and eccentric to that of another system and comprising a material engaging surface of the drum during a part of its revolution, separate reciprocating means comprising an inclined guide track to receive said arms of a system for imparting a longitudinally forward movement to said system of slats during its material engaging portion of a cycle, a pivotal mounting for said guide track, and means for varying the inclination of the guide track to control the amplitude of the longitudinal reciprocation of said system.

6. In a drum for supporting and conveying continuous material, a plurality of systems of interleaved slats, each slat having a pivotally connected arm, each system revolving about a fixed axis parallel and accentric to that of another system and comprising a material engaging surface of the drum during a part of its revolution, separate reciprocating means comprising an inclined non-rotating guide track to receive said arms for imparting a longitudinally forward movement to each system of slats during its material engaging portion of a cycle, and means comprising eye-bolts for varying the distance of each end of each slat from its axis so that the general contour of the drum may be altered.

7. In a drum for conveying continuous material, a plurality of systems of interleaved slats, an arm pivoted to each slat, each of said systems revolving about a fixed axis parallel to that of another system and comprising a material engaging surface of the drum during a part of its revolution, and independent reciprocating means comprising an inclined guide track engaging the arms extending from the slats in one of said systems for imparting a longitudinal movement to said system of slats.

8. In a drum for conveying continuous material, a plurality of systems of interleaved slats, an arm pivoted to each slat, each of said systems revolving about a fixed axis parallel to that of another system and comprising a material engaging surface of the drum during a part of its revolution, independent means for imparting the desired longitudinal reciprocating movement to each system of slats, each of said means comprising an inclined non-rotating guide track disposed around the axes and engaging said arms during their revolution, a pivotal mounting for said guide track, and means for varying the inclination of each guide track relative to said parallel axes to control the amplitude of the longitudinal reciprocation of each system.

HAROLD T. BATTIN.